2,908,656
Patented Oct. 13, 1959

2,908,656

PRETREATMENT OF NOBLE METAL CATALYSTS

Saul Gerald Hindin, Claymont, Del., and Harold Shalit, Drexel Hill, Pa., assignors to Houdry Process Corporation, Wilmington, Del., a corporation of Delaware No Drawing. Application November 5, 1956
Serial No. 620,195

5 Claims. (Cl. 252—466)

The present invention relates to hydrogenation/dehydrogenation reactions and other catalytic processes carried out over supported platinum or palladium catalysts and is particularly concerned with the pretreatment of such catalysts to improve their resistance to certain deactivating influences encountered in the normal use thereof, especially resistance to deactivation by oxygen and/or water.

Catalysts comprising about 0.1 to 1.0% platinum on aluminaceous supports have found wide use in reforming of gasoline and naphtha fractions for the preparation of motor fuel of improved anti-knock rating as well as for the production of aromatic hydrocarbons for industrial use. The desired aromatic hydrocarbons, recovered as such or as components of the improved motor fuel, obtained in these hydrocarbon conversion processes are largely the result of dehydrogenation of naphthenes present in the charge, which dehydrogenation is promoted in the presence of platinum catalyst. Certain of the catalysts employed in these processes are of the so-called dual-function type, so characterized because these provide in addition to dehydrogenation activity the property of promoting acid catalyzed reactions such as cyclization and isomerization. Platinum and palladium catalysts having hydrogenation and dehydrogenation activity, as well as those catalysts possessing in addition activity in promoting acid catalysis to greater or less degree have also been suggested for use in various processes including those involving hydrogenation or dehydrogenation as a reaction mechanism, such as the conversion of nitro to amino compounds, the hydrogenation of olefins and unsaturated fatty oils, and the production of heterocyclic compounds by ring closure reactions.

A familiar method for preparing supported platinum, and palladium, catalyst involves impregnation of the support, such as activated alumina, from a solution of a halide salt or complex, for example with chloroplatinic acid, followed by drying. While the patented art indicates that the dried catalyst may then be subjected to calcination in air or to reduction in hydrogen-containing gas, usually followed by air calcination, such practice is not generally followed in plant manufacture of supported platinum or palladium catalysts for commercial use. In normal start-up operation of a hydrocarbon reforming unit it is conventional practice to subject the catalyst to reduction with hydrogen under pressure in the unit prior to contacting the charge stock therewith, and this practice is likewise followed as a rule in other chemical operations employing supported platinum or palladium catalysts.

In the start-up of hydrogenative reforming units employing supported platinum catalysts unexpectedly high and rapid losses of catalyst activity were experienced in certain instances, the cause of which was not evident. Investigation of such unit deactivated catalysts by recognized laboratory test methods showed them to have much lower than expected dehydrogenation activity. In an extensive experimental study undertaken to determine the possible factors and variables effecting loss of activity of reforming catalysts, it was found that the presence of moisture in the unit during a start-up operation or the presence of quite small but nevertheless harmful quantities of oxygen during the catalyst reduction step resulted in serious deactivation of supported platinum type catalysts. While not necessarily being bound to this explanation, it was postulated that the detrimental effects of small quantities of oxygen in the hydrogen gas stream employed for catalyst reduction resulted from the water formed therefrom, as such, and in addition damage to the catalyst resulted from the extremely high spot temperatures to which portions of the individual catalyst particles were exposed by way of the exothermic heat liberated in the vicinity of the platinum sites of the catalyst particles, at which sites the reaction $2H_2+O_2 \rightarrow 2H_2O$ (liberating 136K. cal. per mol of $O_2$) was being catalyzed thereby. Water even as vapor in the hydrogen stream appears to be as harmful as oxygen.

While the deactivation of supported platinum, and palladium, catalyst as a result of the presence of water and/or oxygen in the reducing gas during start-up of a catalytic process employing the same could be overcome or considerably lessened by the exercise of suitable precautions and careful control during such start-up, e.g., by measures including the use of hydrogen of high purity and avoiding the presence of moisture and oxygen during the catalyst reduction, the observance of such meticulous control imposes an added and costly burden on the operation of the catalytic process. Moreover, not infrequently small amounts of oxygen or water may accidentally find their way into the processing vessels from various unforeseen sources despite the precautions required to be observed.

Among the objects of the present invention, accordingly, are to provide platinum and palladium catalysts, and particularly such catalysts comprising a relatively small amount of the noble metal substance deposited in or on a porous carrier, which catalysts are less sensitive to the deactivating effects of small amounts of oxygen and moisture that might be present during reduction of the catalysts in the processing units in which the same may be employed. In the use of such more stable catalyst, the stringency of the requirements as to hydrogen purity may be conveniently relaxed so that commonly available sources of hydrogen-containing reducing gas of lesser degrees of purity might be economically utilized in normal start-up operation without extreme untoward effects.

Such supported platinum and palladium catalysts having improved resistance to adverse effects of water and oxygen are obtained, in accordance with the present invention, by impregnating particles with chloroplatinate, drying the particles, subjecting the dried particles to pre-reduction in pure, dry hydrogen (containing less than 0.01 mol percent oxygen and water) at further elevated temperature in the range of 500–1000° F. and at low to moderate pressure (not in excess of 100 pounds per square inch), followed by cooling to at least below 250° F. before exposing the thus treated catalyst to air or other oxygen or water-containing environment.

The beneficial effects of the pre-reduction treatment above described are most pronounced as applied to catalysts containing the platinum or palladium associated as a halide complex in the carrier. Since reduction of the halide noble metal complex to free metallic state takes place quite rapidly and at fairly moderate temperature, highly active sites are created capable of promoting combination of oxygen with hydrogen to develop deleterious exotherms. This fact may explain, at least in part, the reason that it has been found particularly important in the pre-reduction that, after the catalyst has been brought to required reduction temperature and reduced with hydrogen, it should be cooled down, while still in the presence of the hydrogen environment, preferably to room temperature or at least to a temperature below 250° F. before exposing the catalyst to possible contact with oxygen. Once the catalyst has been so cooled it can be exposed to air without adverse effect. It has also been found desirable in carrying out the pre-reduction step to start at low temperature (below 300° F.) and to raise the temperature gradually to the desired reduction temperature in a hydrogen atmosphere.

The catalysts prepared or pretreated in the above-described manner demonstrate remarkable stability against deactivation during normal start-up of a reforming unit by reducing gas containing water or oxygen in amounts far in excess of those quantities which would otherwise be expected to cause considerable deactivation of catalysts which have not received the described pre-reduction treatment.

The activity of a catalyst in promoting dehydrogenation can be readily measured by conversion of cyclohexane thereover under standardized conditions. The test employed in evaluating the several catalysts hereinafter described was carried out by passing a pure grade of cyclohexane ($n_D^{20}=1.4260$) over a 5 cc. sample of the catalyst during a thirty-minute run period, at atmospheric pressure, at a temperature of 650° F., and at a liquid hourly space velocity of 6 volumes of the hydrocarbon per volume of catalyst; hydrogen was added to the charge at the rate of 4 mols per mol of the cyclohexane. Observed deviations in temperature from the 650° F. standard were corrected by reference to an established table of temperature-conversion relationships. The activity of the catalyst is expressed as percent benzene produced from the charge as measured by the refractive index of the liquid condensate. At these operating conditions the reaction is highly selective and no products other than cyclohexane, benzene and hydrogen are found in the reactor effluent.

Catalyst composed of 0.5% Pt by weight on alumina, prepared by impregnation of activated alumina with chloroplatinic acid, and which has not been subjected to known adverse influences, shows cyclohexane values determined by the above tests, in the range of 75–85% conversion to benzene.

To determine the effect on catalyst activity of pressure during pre-reduction of the catalyst, a series of experiments was carried out in which the reduction of the catalyst in a purified hydrogen stream was effected at various pressure levels between atmospheric and 600 pounds per square inch gauge. The catalyst employed in these experiments contained 0.5% Pt by weight on acid-modified activated alumina and was prepared in accordance with Example I of U.S. Patent No. 2,723,947 except that drying of the chloroplatinate impregnated particles was carried out at 240° F. and the 1050° F. air calcination of the chloroplatinate impregnated particles was omitted. The dried uncalcined particles were placed in the reactor surmounted by a preheater section consisting of a layer of quartz. Purified hydrogen, after passage through a drying tower packed with calcium sulfate was passed directly into the reactor at the run pressure and after fifteen minutes of hydrogen flow, the reactor temperature was raised to 900° F. (requiring 30 to 45 minutes) and held at that temperature for one hour. While maintaining the hydrogen flow, the catalyst was quickly cooled to room temperature (15–20 minutes were required). The pressure was then permitted to reach atmospheric (in those runs above atmospheric) and the catalyst discharged after a 15-minute nitrogen purge.

Runs were made at pressures of atmospheric to 600 pounds per square inch gauge in 100 p.s.i.g. intervals and the treated catalyst from each run tested in the dehydrogenation of cyclohexane under the standard conditions above described. It was found that between atmospheric and 300 p.s.i.g. pressure the activity of the treated catalyst decreased, to some extent, almost linearly with the increase of pressure, showing a cyclohexane activity of over 82% conversion to benzene when reduced at atmospheric pressure and falling to about 70% cyclohexane conversion for the catalyst reduced at 300 p.s.i.g. Between 300 p.s.i.g. and 600 p.s.i.g. reduction pressures, little, if any, further decrease in activity occurred.

To determine the effect of the presence of oxygen in the reducing gas, another series of runs was carried out in the equipment hereinbefore described. Controlled quantities of oxygen were added to the hydrogen gas stream by passing the stream through an electrolytic cell containing water and having a controllable rate of electrolysis, before passing the gas through the drying tower. On subsequent activity test it was found that at 300 p.s.i.g. pressure (that used in normal start-up operations for reforming) the cyclohexane conversion activity declined steadily with increasing oxygen concentration in the gas at the rate of about 5 cyclohexane numbers (5% reduction in cyclohexane conversion) per 0.1 mol percent oxygen in the range of up to 0.3% oxygen; above 0.3% oxygen to 1.0% oxygen the reduction in activity was at a less pronounced rate, levelling off at an activity of about 55% cyclohexane conversion for the catalyst reduced in the presence of 0.5% mol percent $O_2$. At 100 p.s.i.g. pressure, similar reduction in activity was observed, the extent of deactivation at constant oxygen concentration increasing with increase of pressure. When the reduction was carried out at atmospheric pressure, more tolerance for oxygen present in the reducing gas was observed.

Substantially similar effects were observed when water was added to the hydrogen gas stream instead of the oxygen in amounts equivalent to the same mol percent available oxygen.

X-ray diffraction studies were made of the reduced catalysts and these showed an inverse relationship between the intensity of the 2.28 A. platinum line and the cyclohexane value, which would indicate that the decline in dehydrogenation activity of the catalyst may be caused by a clumping of Pt atoms into larger crystallites of lower area.

The improved stability of catalyst subjected to the prescribed pre-reduction treatment will be seen from the following experimental results. Catalyst composed of 0.5% Pt on activated alumina and prepared by impregnation of the acid-treated carrier with chloroplatinic acid in the manner hereinbefore described was dried at 240° F., subjected to reduction in purified hydrogen at atmospheric pressure and at a temperature of 900° F., then cooled in the hydrogen stream to room temperature. The treated catalyst was exposed to air at room temperature for several days or more. The catalyst was then subjected in a series of separate runs to contact at 900° F. with hydrogen containing 0.5 mol percent and 1.0 mol percent $O_2$, respectively, and then tested for activity in conversion of cyclohexane. The results are given in the table below and compared with catalyst which had not been pre-reduced, but similarly subjected to an oxygen-containing hydrogen gas stream.

| Stability Test Conditions | | Cyclohexane Conv., Percent | |
|---|---|---|---|
| Pressure, p.s.i.g. | $O_2$ in $H_2$ Gas Stream, mol percent | Not Pre-reduced | Pre-reduced |
| 300 | 0.5 | 55 | 79 |
| 300 | 1.0 | 54 | 75 |
| 300 | <0.01 | 70 | |
| 300 | 0.1 | 66 | |
| 15 | >0.01 | 82 | 81 |

While the reduction of platinum-halide catalyst at atmospheric pressure starts at about 300° F., it is preferred to employ temperatures of at least 450–500° F. in order that the reduction can be completed in about 10 minutes.

Obviously many modifications and variations of the present invention as hereinbefore set forth may be made, without departing from the spirit and scope thereof and therefore only such limitations should be imposed as are indicated in the appended claims.

What is claimed is:

1. The method of preparing supported noble metal catalysts of improved resistance to the adverse effects of water and oxygen, which comprises impregnating a porous alumina carrier with a minor quantity of decomposable platinum compound, drying the thus impregnated carrier containing said compound, subjecting the dried material to reduction in an atmosphere of pure dry hydrogen at increased temperature in the range of about 500–1000° F. and at a low pressure not in excess of 100 pounds per square inch, and cooling the so reduced material to at least below 250° F. before possible exposure to oxygen or water environment.

2. The method of preparing supported noble metal catalysts of improved resistance to the adverse effects of water and oxygen, which comprises impregnating activated alumina with a minor quantity of platinum in the form of chloroplatinic acid, drying the thus impregnated alumina containing said chloroplatinic acid, subjecting the dried material to reduction in an atmosphere of pure dry hydrogen at increased temperature in the range of about 500–1000° F. and at a low pressure not in excess of 100 pounds per square inch, and cooling the so reduced material to at least below 250° F. before possible exposure to oxygen or water environment.

3. The method in accordance with claim 2 wherein such cooling is effected in a hydrogen environment.

4. The method according to claim 2 wherein said impregnated carrier is subjected to hydrogen atmosphere at lower temperature and the temperature then raised gradually to the desired reduction temperature.

5. The method according to claim 2 wherein said reduction is effected at substantially atmospheric pressure.

References Cited in the file of this patent

UNITED STATES PATENTS

| | | |
|---|---|---|
| 2,550,531 | Ciapetta | Apr. 24, 1951 |
| 2,611,736 | Haensel | Sept. 23, 1952 |
| 2,611,749 | Haensel | Sept. 23, 1952 |
| 2,750,329 | Barrett et al. | June 12, 1956 |

UNITED STATES PATENT OFFICE

CERTIFICATE OF CORRECTION

Patent No. 2,908,656                      October 13, 1959

Saul Gerald Hindin et al.

It is hereby certified that error appears in the printed specification of the above numbered patent requiring correction and that the said Letters Patent should read as corrected below.

Column 4, in the table, under the heading, "$O_2$ in $H_2$ Gas Stream, mol percent", line 5 thereof, for " >0.01" read — <0.01 —.

Signed and sealed this 7th day of June 1960.

(SEAL)
Attest:

KARL H. AXLINE
Attesting Officer

ROBERT C. WATSON
Commissioner of Patents